United States Patent
Liu et al.

(10) Patent No.: US 9,081,624 B2
(45) Date of Patent: Jul. 14, 2015

(54) AUTOMATIC LOAD BALANCING, SUCH AS FOR HOSTED APPLICATIONS

(75) Inventors: Eric Liu, Mill Creek, WA (US); Michael Ott, Redmond, WA (US); Nirav Shah, Seattle, WA (US); Matthew Cooper, Issaquah, WA (US); Ramesh Bangalore, Redmond, WA (US); Pat Munns, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1813 days.

(21) Appl. No.: 12/146,505

(22) Filed: Jun. 26, 2008

(65) Prior Publication Data

US 2009/0328050 A1      Dec. 31, 2009

(51) Int. Cl.
*G06F 9/46* (2006.01)
*G06F 9/50* (2006.01)

(52) U.S. Cl.
CPC ...... *G06F 9/5088* (2013.01); *G06F 2209/5022* (2013.01)

(58) Field of Classification Search
None
See application file for complete search history.

(56) References Cited

U.S. PATENT DOCUMENTS

| | | | |
|---|---|---|---|
| 6,516,350 B1 | 2/2003 | Lumelsky et al. | |
| 7,155,722 B1 | 12/2006 | Hilla et al. | |
| 7,249,179 B1 | 7/2007 | Romero et al. | |
| 7,454,458 B2 * | 11/2008 | Islam et al. | 709/203 |
| 2002/0087611 A1 * | 7/2002 | Tanaka et al. | 709/1 |
| 2003/0055971 A1 | 3/2003 | Menon | |
| 2004/0111725 A1 * | 6/2004 | Srinivasan et al. | 718/105 |
| 2004/0117476 A1 | 6/2004 | Steele et al. | |
| 2005/0149940 A1 * | 7/2005 | Calinescu et al. | 718/104 |
| 2006/0112247 A1 | 5/2006 | Ramany et al. | |
| 2006/0294238 A1 * | 12/2006 | Naik et al. | 709/226 |
| 2007/0174839 A1 * | 7/2007 | Takahashi et al. | 718/100 |
| 2007/0234366 A1 | 10/2007 | Morich et al. | |
| 2007/0260732 A1 * | 11/2007 | Koretz | 709/226 |
| 2007/0271560 A1 | 11/2007 | Wahlert et al. | |

OTHER PUBLICATIONS

Uthayopas, et al., "Building a Resources Monitoring System for SMILE Beowulf Cluster", In Proceeding of the Third International Conference/Exhibition on High Performance Computing in Asia-Pacific Region, 1998, 5 pages.
Songnian Zhou, "A Trace-Driven Simulation Study of Dynamic Load Balancing", Sep. 1986, 30 pages.
Balasubramanian, et al., "Evaluating the Performance of Middleware Load Balancing Strategies", Proceedings. Eighth IEEE International Enterprise Distributed Object Computing Conference, 2004, pp. 1-13.

(Continued)

*Primary Examiner* — Gregory A Kessler
(74) *Attorney, Agent, or Firm* — Damon Rieth; Stein Dolan; Micky Minhas (57) ABSTRACT

A dynamic load balancing system is described that determines the load of resources in a hosted environment dynamically by monitoring the usage of resources by each customer and determines the number of customers hosted by a server based on the actual resources used. The system receives a performance threshold that indicates when a server is too heavily loaded and monitors the resource usage by each customer. When the load of an overloaded server in the hosted environment exceeds the received performance threshold, the system selects a source customer currently hosted by the overloaded server to move to another server.

20 Claims, 4 Drawing Sheets

(56) References Cited

OTHER PUBLICATIONS

Chen, et al., "Self-Deployment and Self-Configuration of Network Centric Service", IEEE International Conference on Pervasive Computing (IEEE ICPC), 2004, 8 pages.

Jann, et al., "Dynamic Reconfiguration: Basic Building Blocks for Autonomic Computing on IBM pSeries Servers", IBM Systems Journal, vol. 42, No. 1, 2003, pp. 29-37.

* cited by examiner

AUTOMATIC LOAD BALANCING, SUCH AS FOR HOSTED APPLICATIONS

BACKGROUND

It is becoming more and more common to run software applications in a shared hosting environment. For example, an application service provider (ASP) is a business that provides computer-based services to customers over a network. Those in the art often refer to software offered using an ASP model as on-demand software or software as a service (SaaS). The most limited sense of this business is that of providing access to a particular application program (such as medical billing) using a standard protocol such as HTTP. There is a growing market for hosted services where a hosting provider invites customers to submit and run their custom applications in an environment shared with other applications. One example of a hosted application environment is a web-based customer relations manager (CRM) application, such as SalesForce.com. Using shared hosting frees the customer from the burden of purchasing and administering servers, and allows the hosting provider to realize economies of scale that come from managing many servers for hosted applications.

In computer networking, load balancing is a technique to spread work between two or more computers, network links, CPUs, hard drives, or other resources, in order to get good resource utilization, throughput, or response time. Using multiple components with load balancing, instead of a single component, may increase reliability through redundancy. It is commonly used to mediate internal communications in computer clusters, especially high-availability clusters. In the area of hosted applications, one way to balance the load among servers it to assign each customer to a server or group of servers.

In a shared hosting environment, the hosting provider is responsible for ensuring that servers do not become too overloaded and that one application or customer does not affect the availability of resources for other applications or customers. Each customer wants to be treated as if his/her application is the only one running on the resources provided by the host. The host, on the other hand, wants to place as many customers on the same hardware as possible to reduce the cost of purchasing hardware and to reduce the number of servers and other resources that system administrators have to manage. One way of balancing these two priorities is by determining the maximum load that a customer can place on the hosted environment. The distribution of customers on a particular server can then be determined by dividing the total resources of the server by the resources consumed by each customer. However, this may lead to under loading of the server as few customers may ever use such high levels of load on the server and even those that do will often not do so all at the same time.

SUMMARY

A dynamic load balancing system is described that determines the load of resources in a hosted environment dynamically by monitoring the usage of resources by each customer and determines the number of customers hosted by a server based on the actual resources used. The system receives a performance threshold that indicates when a server is too heavily loaded. The system monitors the resource usage by each customer and cumulatively by all of the customers on a server or group of servers. When the load of an overloaded server in the hosted environment exceeds the received performance threshold, the system selects a source customer currently hosted by the overloaded server to move. The system selects a target server in the hosted environment with a load lower than the load of the overloaded server and moves the source customer to the target server. Thus, by dynamically adjusting the load of each server rather than dividing load based on a static theoretical limit, the dynamic load balancing system more heavily loads each server while still staying within the server's capacity and still providing reliable service to each customer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A dynamic load balancing system is described that determines the load of resources in a hosted environment dynamically by monitoring the usage of resources by each customer and determines the number of customers hosted by a server based on the actual resources used. The system stores a performance threshold that indicates when a server is too heavily loaded. For example, the threshold may specify that 70% CPU usage indicates a heavily loaded server. The system monitors the resource usage by each customer and cumulatively by all of the customers on a server or group of servers. For example, the system may monitor CPU usage, memory consumption, disk space usage, I/O requests, database calls, database log size, and so forth. When the load of an overloaded server in the hosted environment exceeds the stored performance threshold, the system selects a source customer currently hosted by the overloaded server to move. For example, the system may select the customer whose application has the highest average load on the system. The system selects a target server in the hosted environment with a load lower than the load of the overloaded server. For example, the system may select the server with the lowest average load. The system moves the source customer to the target server. For example, the system may copy application data such as database data, web server data, and so forth from the original server to the target server. Thus, by dynamically adjusting the load of each server rather than dividing load based on a static theoretical limit, the dynamic load balancing system more heavily loads each server while still staying within the server's capacity and still providing reliable service to each customer.

Figure 1:
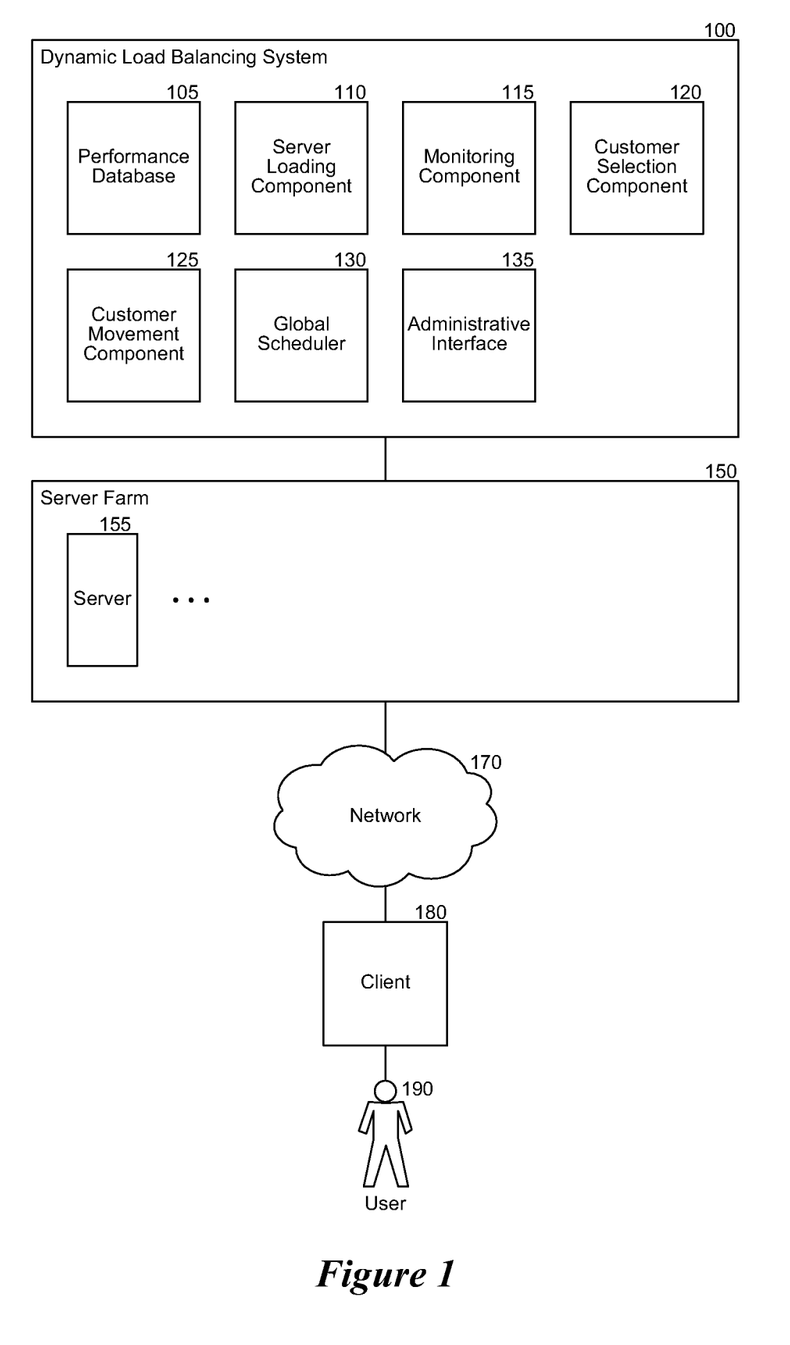
FIG. 1 is a block diagram that illustrates components of the dynamic load balancing system, in one embodiment.

FIG. 1 is a block diagram that illustrates components of the dynamic load balancing system, in one embodiment. The system 100 includes a performance database 105, a server-loading component 110, a monitoring component 115, a customer selection component 120, a customer movement component 125, a global scheduler 130, and an administrative interface component 135. Each of these components is described in further detail below. The system 100 is connected to a server farm 150 that includes multiple servers 155.

The system 100 and server farm 150 may be connected via the network 170 or via a separate private network (not shown), such as within a data center. A client 180 connects to the server farm 150 through network 170 to use the customer applications running on server 155. For example, the server 155 may provide a web-based interface, and the client 180 may connect using a web browser through the Internet. A user 190 typically controls the client 180, although the client 180 can also be controlled by another application or automated process.

The performance database 105 stores performance information and provides a historical view of the usage of the resources within the hosted environment. The system 100 may warn an administrator or invoke other components of the system 100 when the performance of a resource exceeds a tolerance or threshold. For example, if CPU usage of a server exceeds 80%, the system 100 may notify a system administrator or invoke the other components to perform an automatic move of some customers off the heavily loaded server. As another example, for a server with a 240-gigabyte disk, the system 100 may warn the administrator when the capacity of the disk is down to 120 gigabytes.

The server-loading component 110 adds new customers to a server based on the criteria dynamically determined by the system 100. The server-loading component 110 may add new customers to a server until a performance alert is received as tracked by the performance database. For example, the server-loading component 110 may add customers to a server until the CPU usage reaches 70%. As the number of customers hosted by a server increases, the likelihood of overall anomalies in their behavior that causes problems for the system 100 decreases. For example, if there are 100 customers hosted on a server, even if one of them spikes to its maximum usage, the spike is a small enough unit of the server's overall capacity that the spike is not likely to affect the performance of the server.

The monitoring component 115 monitors the performance of each server and generates a notification when the performance falls below a threshold. For example, the monitoring component 115 may watch the CPU usage, memory usage, I/O requests, and so forth to determine when a server is too heavily loaded. When the monitored criteria exceed the threshold, then the monitoring component 115 informs the customer selection component 120 to select a customer or multiple customers to move from the heavily loaded server to another server in the hosted environment.

When the performance database 105 determines that a server is too heavily loaded, the customer selection component 120 determines which customers to move and which server to move them to. The customer selection component 120 may have a fixed goal of removing a certain amount of load from the server. For example, the customer selection component 120 may move customers off the server until the resource usage of the server decreases by 10%. The customer selection component 120 uses the performance database to select a target server to which to move customers from the overloaded server. For example, the customer selection component 120 may select the least loaded server in the system 100 as a target. The system 100 may also select a target server that is closest to a target load threshold (e.g., 70%) to try to get each server to the target load threshold and avoid adding new hardware until it is hard to avoid. If all of the servers are too heavily loaded, then the system 100 may send a notification to an administrator to obtain new hardware.

The customer movement component 125 handles moves of a customer from one server to another. The steps that the customer movement component 125 performs to move a customer depend on the type of application the customer is running on the hosted service. For example, for a typical CRM application, the customer movement component 125 backs up an application database and moves the information in the database to another server. The customer movement component 125 also moves the host name associated with the customer (e.g., a Domain Name System (DNS) name) to the Internet Protocol (IP) address of the new server. For example, the component 125 may setup an HTTP 301 or 302 redirect from the old IP address to the new IP address, so that users attempting to connect to the customer's application will find it at its new location. Finally, if the CRM application has custom web pages, then the component 125 moves the custom web pages from one web server to another. The customer's application may not be available during the move, so the customer movement component 125 may display a web page that indicates that maintenance is in progress to inform users.

Before moving a customer's application from one server to another, the customer movement component 125 may freeze any new incoming requests and wait for a job queue associated with the application to clear all of its jobs. For example, the application may have delayed database row deletions (such as when an application performs soft deletes after a user request, flagging rows for later bulk deletion), workflows, backup requests, and other tasks that would not be performed correctly if the application were moved before the tasks complete. Thus, the component 125 may wait for these jobs to finish and then complete the move from one server to another.

The global scheduler 130 provides a generic task engine for assigning routine jobs that the dynamic load balancing system 100 performs. For example, customer moves can be scheduled by the customer movement component 125 using the global scheduler 130. The customer movement component 125 may add a database move task, for example, to the global scheduler 130. The global scheduler 130 also provisions new servers for use by the server-loading component 110. When the global scheduler 130 completes a task, it can provide a notification to the component that submitted to the task, so that the submitting component can perform further processing. Thus, the global scheduler 130 ensures that tasks are completed throughout the system 100 in an orderly manner and as resources are available. The operator of the system 100 may inform customers of a maintenance window during which the global scheduler will typically perform tasks (e.g., Sundays from 3-6 A.M.) so that customers know when their applications may be unavailable.

The administrative interface component 135 provides a user interface for a system administrator to configure and monitor the system 100. The administrative interface component 135 may provide facilities for adding customers, removing customers, manually removing customers, setting performance alerts, modifying thresholds, adding new servers, viewing performance statistics, and so forth. The administrative interface may provide a graphical user interface (GUI), command-line interface (CLI), web-based interface, or other common types of interface.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
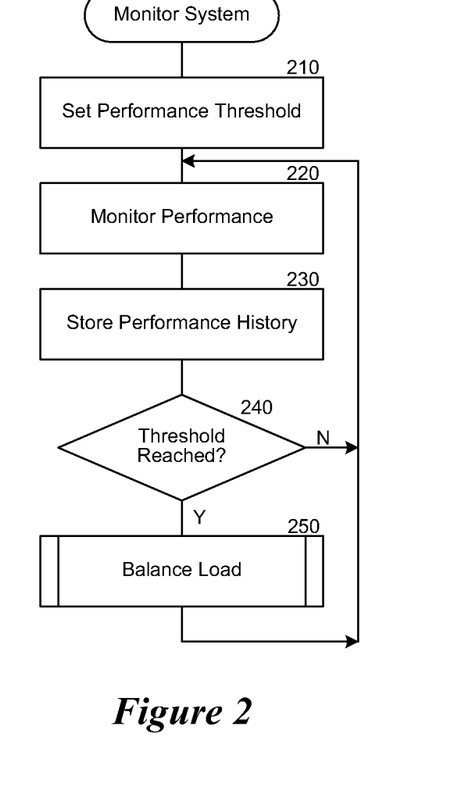
FIG. 2 is a flow diagram that illustrates the processing of the monitoring component, in one embodiment.

FIG. 2 is a flow diagram that illustrates the processing of the monitoring component, in one embodiment. The component monitors the system on an ongoing basis. In block 210, the component sets one or more performance thresholds. For example, an administrator may define thresholds for CPU usage, disk space usage, memory usage, and so forth. The thresholds are set at a level that indicates that a server is becoming too loaded and may be adjusted over time. In block 220, the component monitors the performance of the system. For example, the component may use performance counters and other tools to gather information about each server's performance. In block 230, the component stores the performance information in a database of historical performance information. For example, the database may contain a table of performance data categorized by customers and/or by servers within the system that allows an administrator to retrieve a report with historical performance data by customer or server.

In decision block 240, if a performance threshold has been reached, then the component continues at block 250, else the component loops to block 220 and continues monitoring performance. The sampling frequency of performance data may be adjusted automatically or by an administrator based on how quickly servers go from being satisfactorily loaded to being too heavily loaded and based on the load on the system that monitoring imposes. In block 250, the component informs other components of the system to balance the load to return performance to a level within the threshold (see FIG. 3). For example, the system may move customer applications off the heavily loaded server to a more lightly loaded server.

Figure 3:
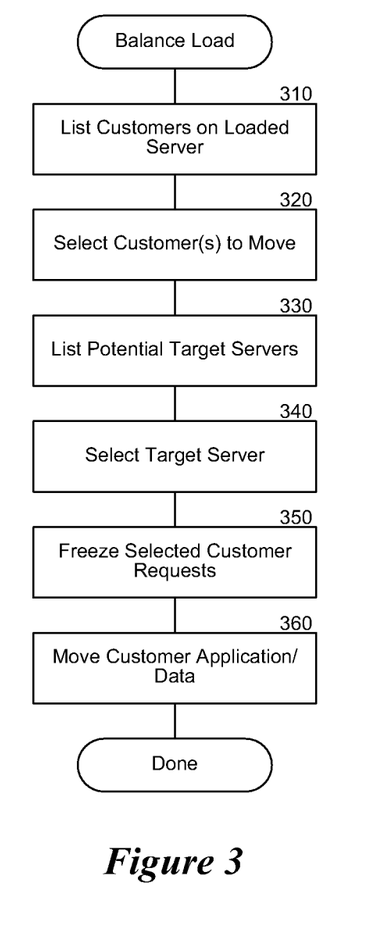
FIG. 3 is a flow diagram that illustrates the processing of the customer selection component, in one embodiment.

FIG. 3 is a flow diagram that illustrates the processing of the customer selection component, in one embodiment. The component is invoked when the system identifies a server that is too heavily loaded based on tracked performance criteria. In block 310, the component lists the customers on the heavily loaded server. For example, the component may access the performance database or a configuration database to determine what customers are assigned to the server. In block 320, the component selects customers to move off the server. For example, the component may select a customer or customers that will alleviate at least 10% of the load from the server once moved. In block 330, the component lists the potential target servers to which to move the selected customers. For example, the component may access the performance database to determine a server that is currently the least loaded. In block 340, the component selects the target server. In block 350, the component freezes requests to the selected customer to be moved. For example, the component may put up a maintenance page at the front entrance of the customer website so that no new requests are received. In block 360, the component moves the customer application and data from the heavily loaded server to the selected target server. For example, the component may copy database backup files, website configuration data, and other application data to the new server. The component may also set up a redirect so that requests that arrive at the old server are redirected to the new server.

Figure 4:
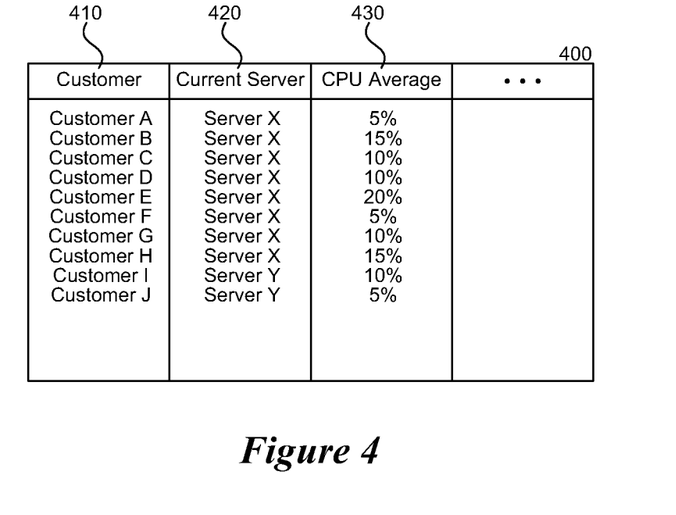
FIG. 4 is a table that illustrates an example of data in the performance database, in one embodiment.

FIG. 4 is a table that illustrates an example of data in the performance database, in one embodiment. The table 400 contains a customer column 410, a current server column 420, a CPU average column 430, and other columns (not shown) for tracking performance information. The data in the table contains information about 10 different customers distributed across two servers, Server X and Server Y. Server X is experiencing a 90% average CPU usage, which is above a threshold set at 80%. The dynamic load balancing system examines the performance data and determines that some customers will be moved from Server X to another server to alleviate some of the burden on Server X. For example, the system may select Customer A and Customer B to move, because doing so will remove 20% of the average CPU usage from Server X. The system may select Server Y as the target server to move to, because Server Y is only experiencing a 20% average CPU usage. These numbers are only used as examples, and factors in addition to CPU usage may be considered. Different applications rely more heavily on different resources, and thus other metrics or combinations of metrics may be a more useful measure of when a server is becoming too heavily loaded.

In some embodiments, the dynamic load balancing system operates at the granularity of groups of servers rather than single servers. For example, a particular type of application may use the same server configuration for each customer, including a web server, database server, and so on. When the system considers the load of an application, it considers the load of the application on all of the servers within the group. When the system considers moving an application, then the system determines whether any server in the group is overloaded, and if so moves the application data from the group of servers to a new group of servers.

In some embodiments, the dynamic load balancing system moves elements within a customer application. For example, the system may monitor database and web server usage separately, and determine that a web server associated with a customer application is too heavily loaded, but a database is not. As a result, the system may move only the web server, but leave the database server alone. This allows more fine-grained tuning of server usage within the system so that each server can be efficiently loaded. In particular, some applications may have unbalanced resource usage where the applications rely much more heavily on one type of resource than another. Load balancing within the application allows the system to spread out the more heavily loaded resource without under loading the other, less heavily loaded resources.

In some embodiments, the dynamic load balancing system limits the number of items monitored to save processing time. For example, for some applications the system may determine that disk usage is a good indicator of the load of the application. In such cases, the system can ignore monitoring other items, such as CPU usage, and instead monitor disk usage. Based on the monitored items, the system determines when a server is too heavily or too lightly loaded and adjusts the number of customers assigned to be served from the server accordingly.

In some embodiments, the dynamic load balancing system allows an administrator to tune the thresholds described herein. For example, an administrator may define the level of CPU usage that triggers a move of customer applications from one server to another. Alternatively or additionally, the dynamic load balancing system may dynamically determine where to set the thresholds, such as by examining historical performance data. For example, the system may determine that a CPU usage of 80% is acceptable based on past spikes in usage being smaller than 20%, such that the server is unlikely to be overwhelmed by an 80% steady state load.

In some embodiments, the dynamic load balancing system separates applications based on the application type. For example, the hosting provider may offer several stock keeping units (SKUs) of a web-based application that customers can choose from (e.g., Standard CRM, Professional CRM, and so forth), and the system may try to keep applications of the same SKU together when moving customers from one server or server group to another. This may be useful if, for example, the hosting provider makes a higher guarantee of availability to customers of a higher paying SKU than a lower paying SKU. The system may set the thresholds more conservatively for some SKUs to ensure that predictions about load are correct and do not lead to exceeding the resource limits of a server and the resulting negative impact to applications on the server.

The dynamic load balancing system can select a customer to move and a target server to which to move the customer based on a variety of criteria, in addition to those described herein. For example, the system may select the source customer that creates the least amount of system downtime (e.g., based on disk space) for users trying to access the customer resource during the move. As another example, performing selections and moves simultaneously on multiple customers may use transient knowledge about other moves and network/system topology to determine a sequence or parallelize the moves to increase efficiency.

From the foregoing, it will be appreciated that specific embodiments of the dynamic load balancing system have been described herein for purposes of illustration, but that various modifications may be made without deviating from the spirit and scope of the invention. For example, although web-based applications have been used in examples, many other types of network-based applications are suitable for use with the system, such as an email server or other hosted applications. Accordingly, the invention is not limited except as by the appended claims.

We claim:

1. A computer-implemented method for dynamically balancing application load on multiple servers in a hosted environment, the method comprising:
   receiving a performance threshold that indicates when a server is too heavily loaded;
   monitoring a usage of servers within the hosted environment;
   when a load of an overloaded server in the hosted environment exceeds the received performance threshold,
   selecting a source customer currently hosted by the overloaded server;
   selecting, from within a source customer application associated with the source customer, which elements to move;
   selecting a target server in the hosted environment with a load lower than the load of the overloaded server;
   submitting a task to a global scheduler to allow a customer move to be coordinated among multiple physical servers and completed as resources become available; and
   via the global scheduler, moving those elements that were selected from within the source customer application to the target server and notifying a submitter of the task upon completion of the customer move.

2. The method of claim 1 further comprising repeating the steps of selecting a source customer, selecting a target server, selecting which elements within the source customer application to move, and moving those elements within the source customer application that were selected to the target server until the load of the overloaded server is below the threshold.

3. The method of claim 1 wherein selecting the source customer comprises determining the customer among multiple customers hosted by the overloaded server that has a highest historical resource usage and based on an amount of downtime for users trying to access a customer resource during the move.

4. The method of claim 1 wherein selecting the source customer comprises determining the customer among multiple customers hosted by the overloaded server that has a historical resource usage closest to a predetermined percentage of resources of the overloaded server.

5. The method of claim 1 wherein selecting the target server comprises selecting a target server among multiple available target servers that has the least historical resource usage.

6. The method of claim 1 wherein selecting the target server comprises selecting a target server among multiple available target servers that has a historical resource usage closest to a target load threshold.

7. The method of claim 1 wherein the source customer application comprises a web server running on multiple servers and a database, and wherein moving those elements that were selected from within the source customer application comprises moving only one of at least the web server and the database from at least one of the multiple servers to the target server.

8. A computer system for dynamically monitoring and adjusting a load between multiple servers in a hosted server farm, the system comprising:
   a processor and memory configured to execute software instructions embodied within the following components;
   a performance database configured to store historical performance information for the multiple servers;
   a monitoring component configured to monitor one or more performance criteria of multiple physical servers, store performance information in the performance database, and provide a notification when the performance of a first physical server reaches a threshold;
   a customer selection component configured to select a customer application running on the first physical server to be moved to a new physical server to return the performance of the first physical server below the threshold and to select which elements to move from within the customer application;
   a customer movement component configured to move the selected elements of the customer application from the first physical server to the new physical server; and
   a global scheduler configured to receive actions to be performed within the system and to complete the actions during a maintenance window, wherein the actions include customer moves scheduled by the customer movement component.

9. The system of claim 8 wherein the global scheduler allows customer moves to be coordinated among multiple physical servers and completed as resources become available, and notifies a submitter of the move upon completion of the customer move.

10. The system of claim 8 further comprising an administrative interface configured to receive requests to configure the system, including a request to adjust the threshold.

11. The system of claim 8 further comprising a server loading component configured to provision new servers and to add new customer applications to the provisioned new servers.

12. The system of claim 8 wherein the monitoring component monitors performance counters on the multiple servers.

13. The system of claim 8 wherein the system includes different thresholds for different classes of servers.

14. A computer-readable device encoded with instructions for controlling a computer system to balance server load in a hosted environment, by a method comprising:
- determining applications running on a heavily loaded server;
- selecting one or more applications from the heavily loaded server to move based on a performance criteria of the applications;
- for each application of the one or more applications, selecting which elements of the application to move;
- determining potential target servers to which to move the selected applications;
- selecting a target server from the determined potential target servers;
- submitting a task to a global scheduler to allow a customer move to be coordinated among multiple physical servers and completed as resources become available; and
- via the global scheduler, automatically moving selected elements of the selected applications from the heavily loaded server to the selected target server, wherein the preceding steps are performed by at least one processor.

15. The device of claim 14 further comprising identifying the heavily loaded server based on the server exceeding a load threshold.

16. The device of claim 14 wherein selecting one or more applications to move comprises determining one or more applications that, if moved, would place the heavily loaded server below a load threshold.

17. The device of claim 14 wherein determining potential target servers comprises determining a load of each target server.

18. The device of claim 14 wherein selecting a target server comprises selecting the potential target server with the lowest average load over a previous period.

19. The device of claim 14 wherein automatically moving the selected elements of the selected applications comprises at least one of copying database data, copying web server data, and setting up a redirect from the heavily loaded server to the selected target server.

20. The device of claim 14 wherein the heavily loaded server comprises a group of servers and moving the selected elements of the selected applications moves the applications from the group of servers to a new group of servers.

* * * * *